J. H. DEAN.
VOTING MACHINE.
APPLICATION FILED DEC. 30, 1899. RENEWED JUNE 8, 1904.

1,055,449.

Patented Mar. 11, 1913.
10 SHEETS—SHEET 1.

WITNESSES

INVENTOR
James H. Dean
BY Paul Hawley
ATTORNEYS.

J. H. DEAN.
VOTING MACHINE.
APPLICATION FILED DEC. 30, 1899. RENEWED JUNE 8, 1904.
1,055,449.
Patented Mar. 11, 1913.
10 SHEETS—SHEET 2.
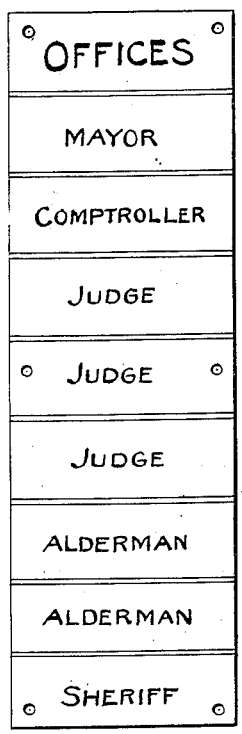
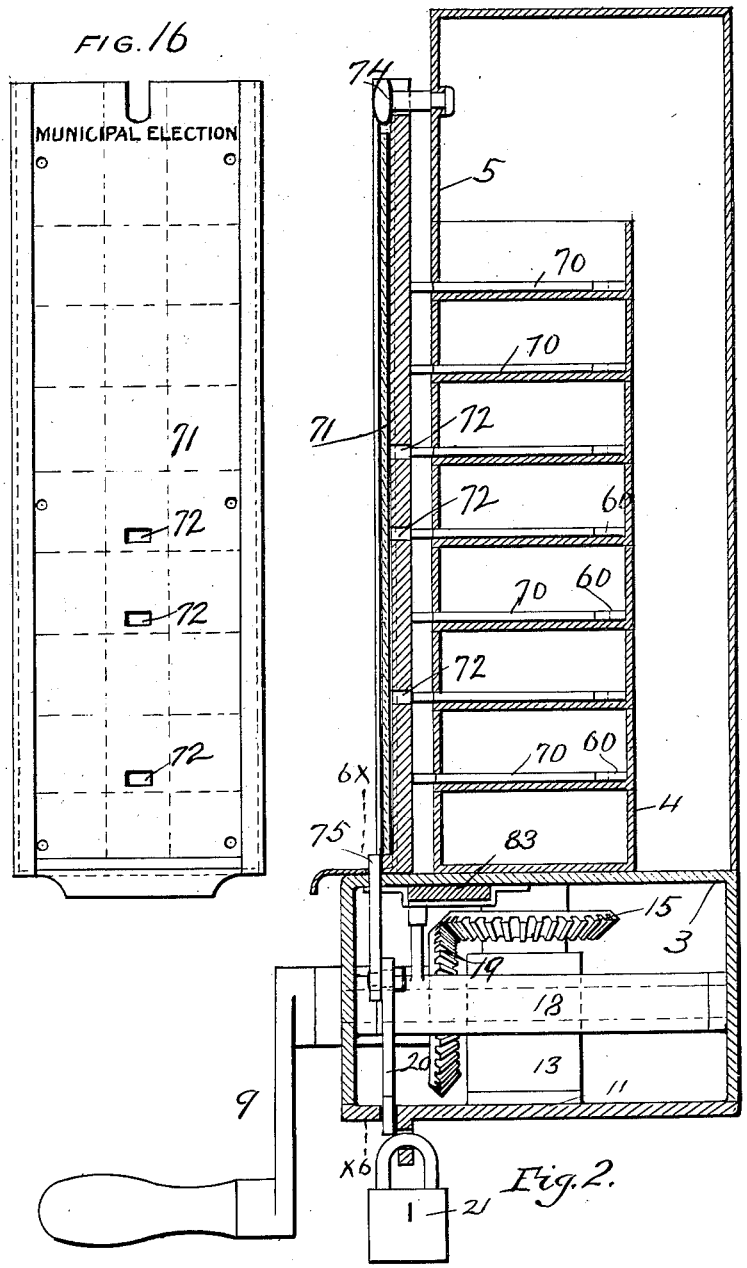
WITNESSES
INVENTOR.
James H. Dean
BY Paul O. Hawley
ATTORNEYS.

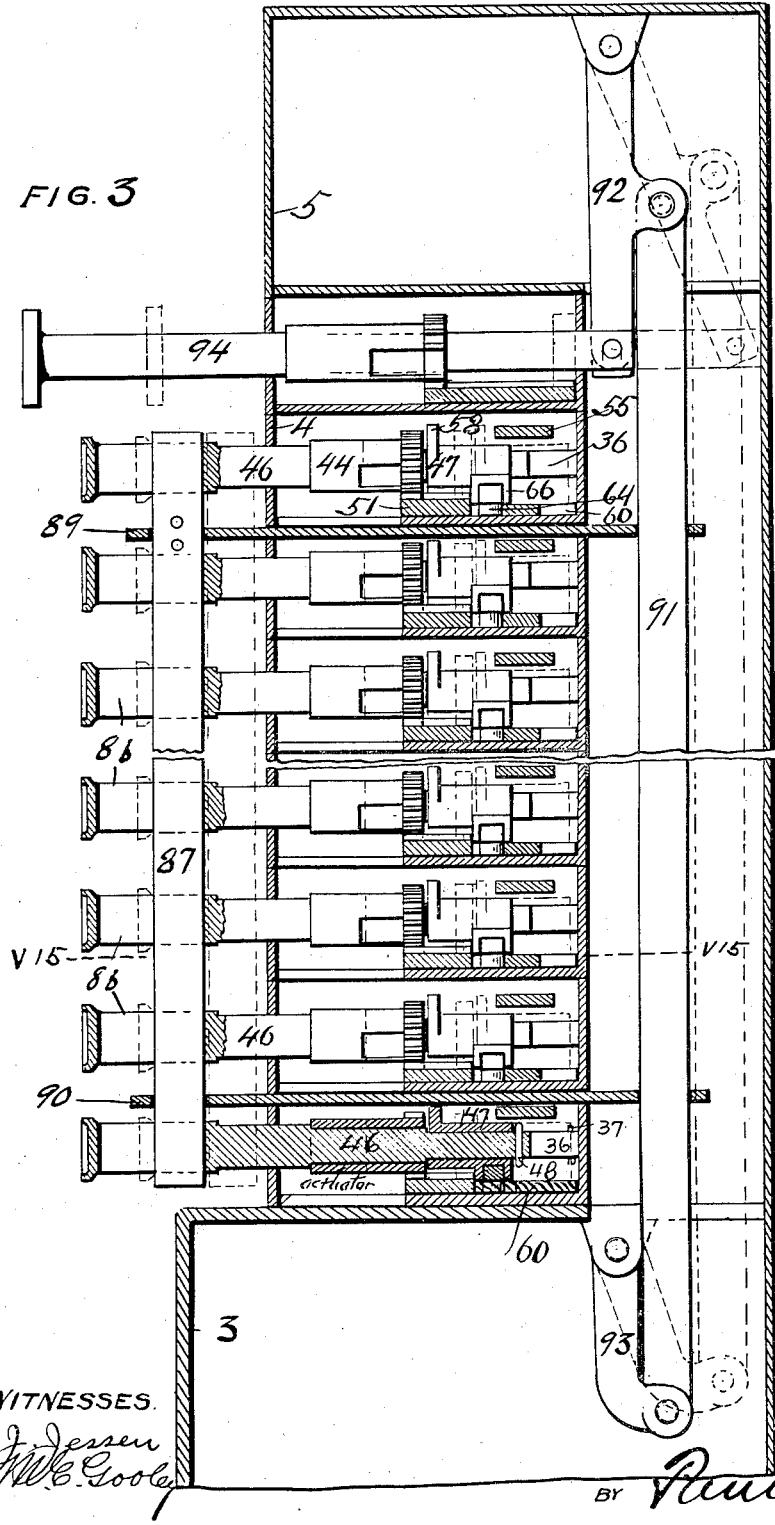

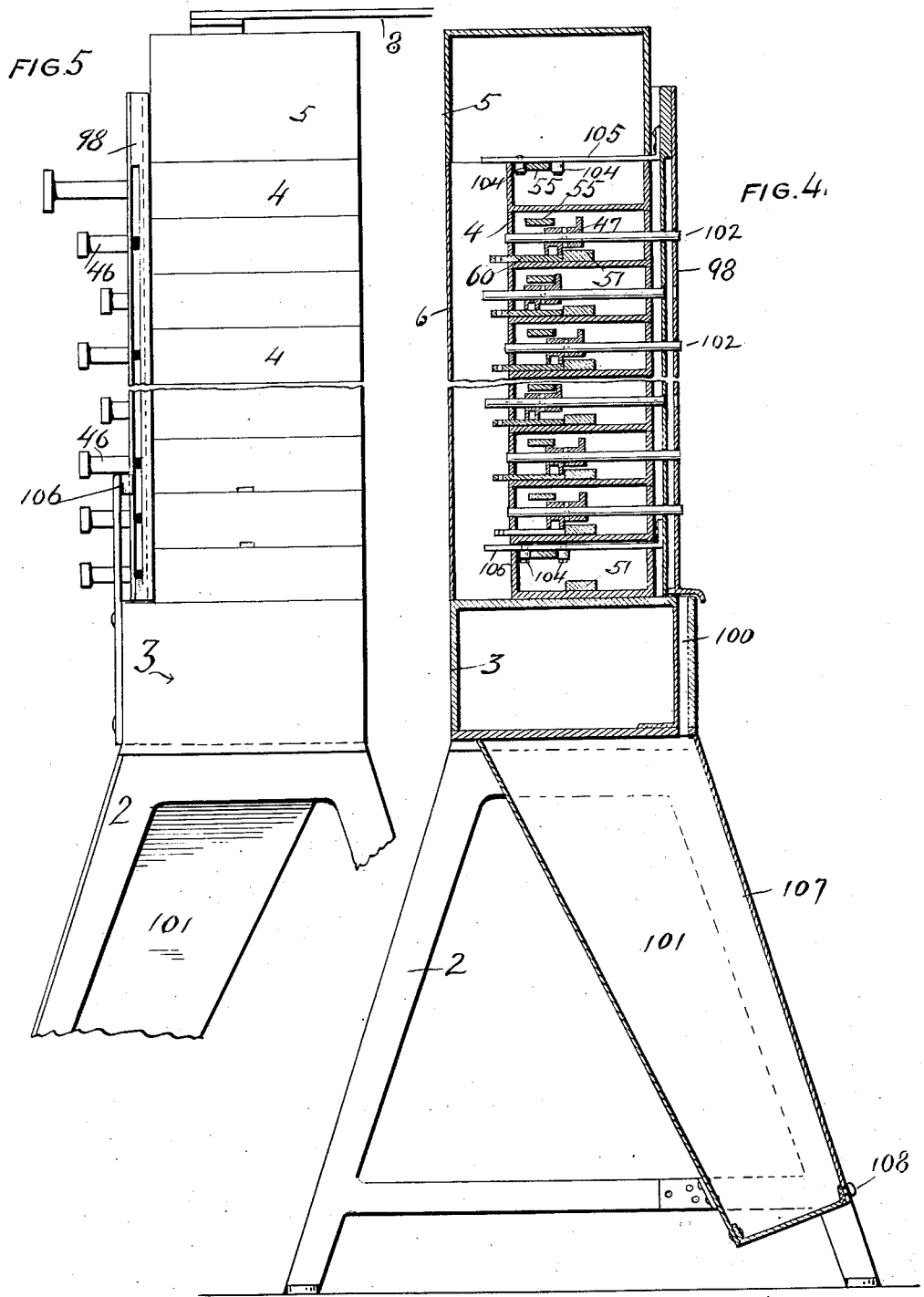

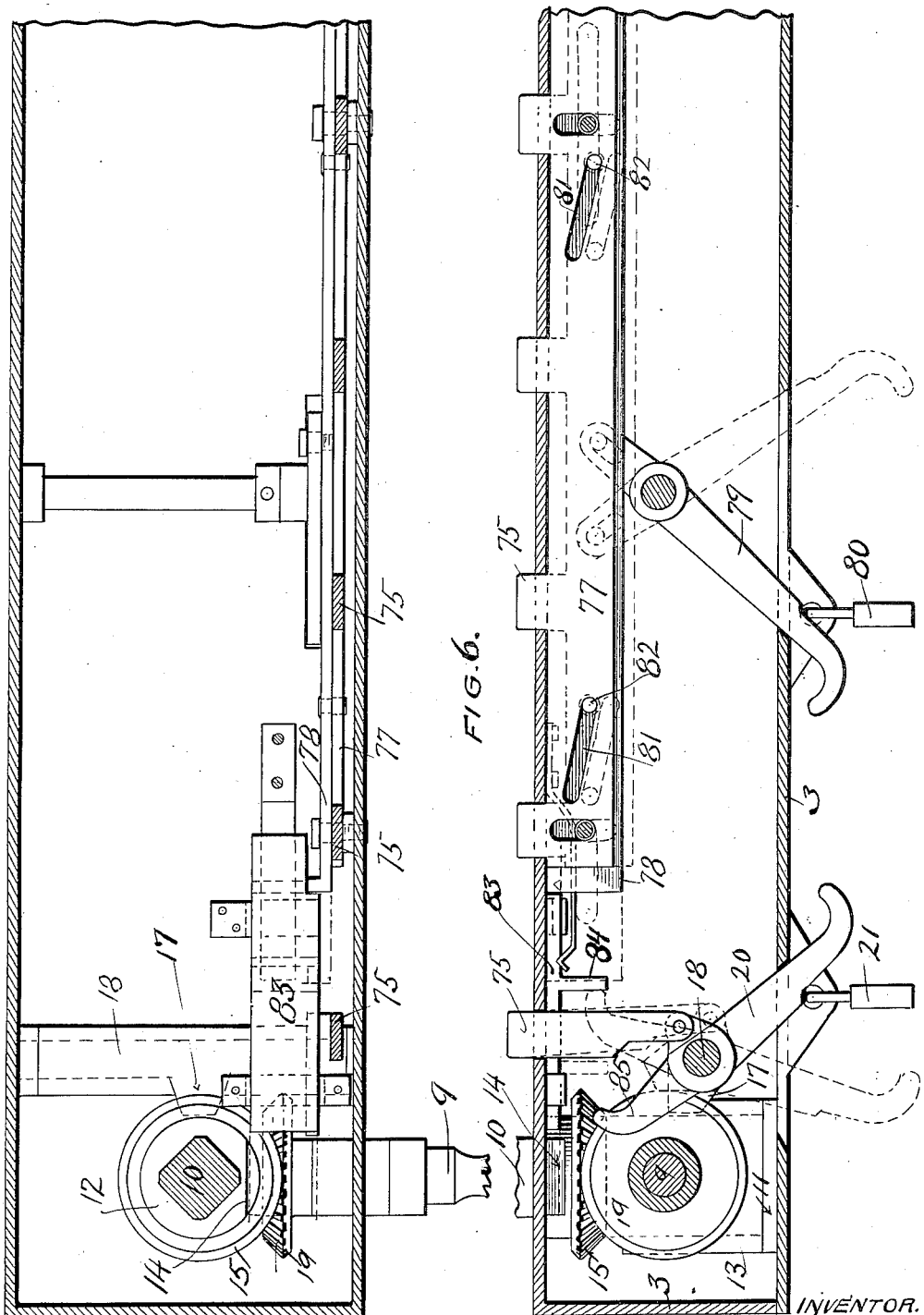

J. H. DEAN.
VOTING MACHINE.
APPLICATION FILED DEC. 30, 1899. RENEWED JUNE 8, 1904.
1,055,449.
Patented Mar. 11, 1913.
10 SHEETS—SHEET 6.
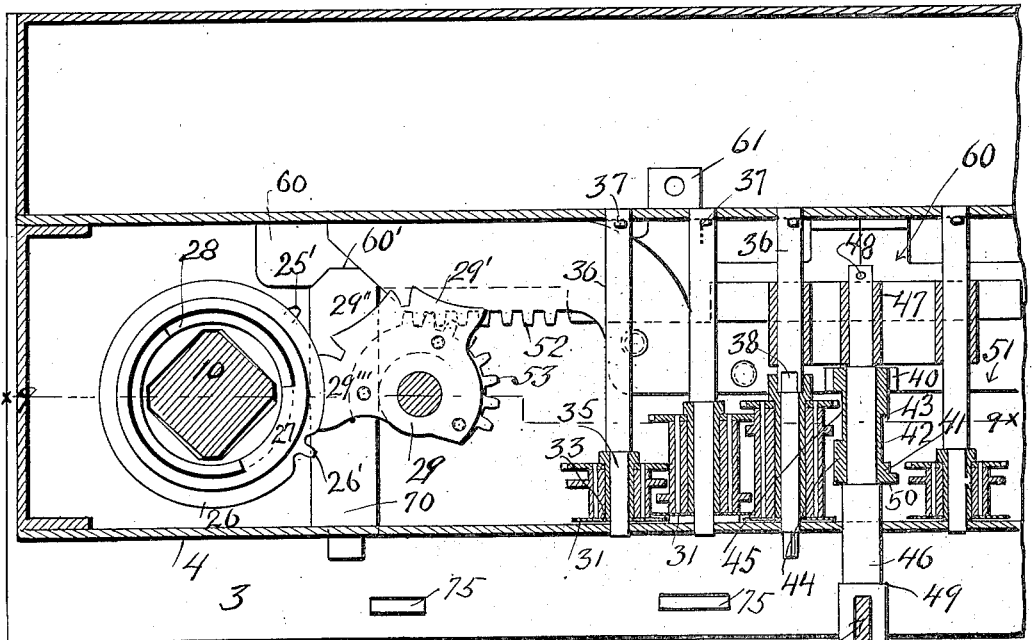
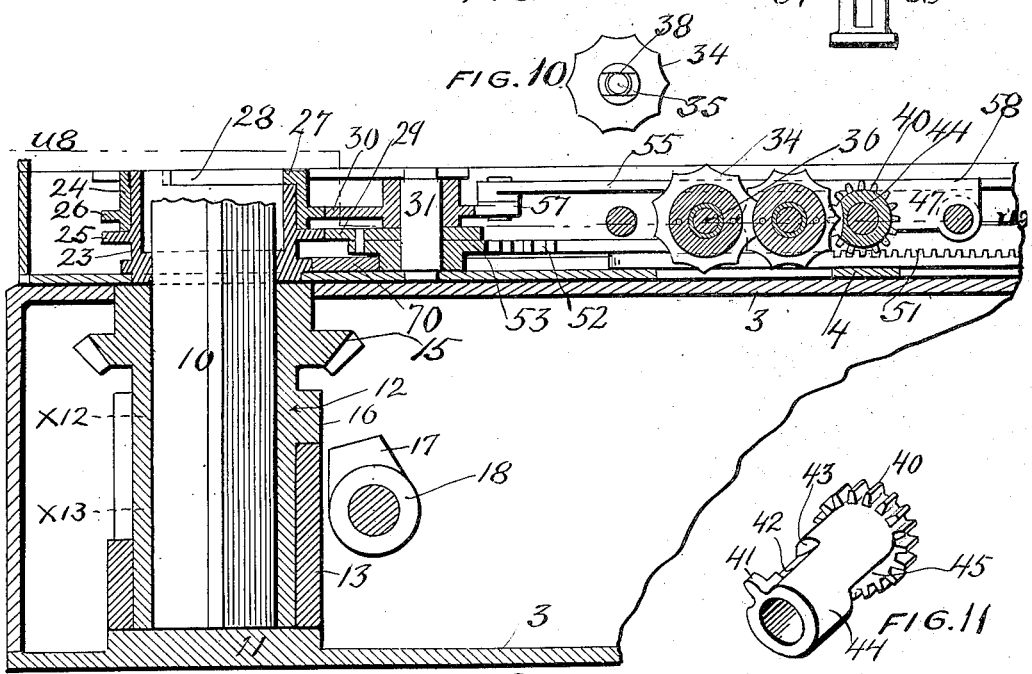
WITNESSES
INVENTOR.
James H. Dean.
BY Paul O. Hawley
ATTORNEYS.

J. H. DEAN.
VOTING MACHINE.
APPLICATION FILED DEC. 30, 1899. RENEWED JUNE 8, 1904.
1,055,449.
Patented Mar. 11, 1913.
10 SHEETS—SHEET 7.
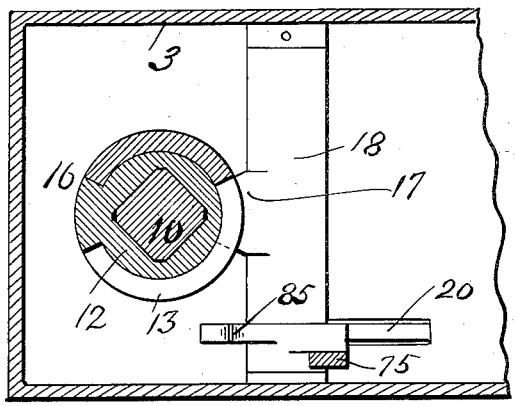
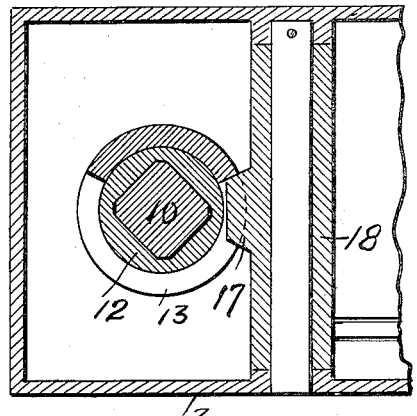
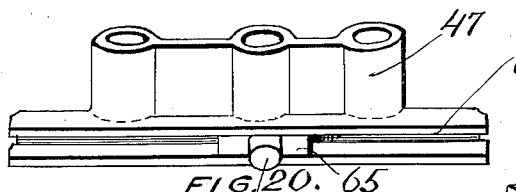
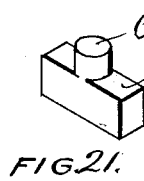
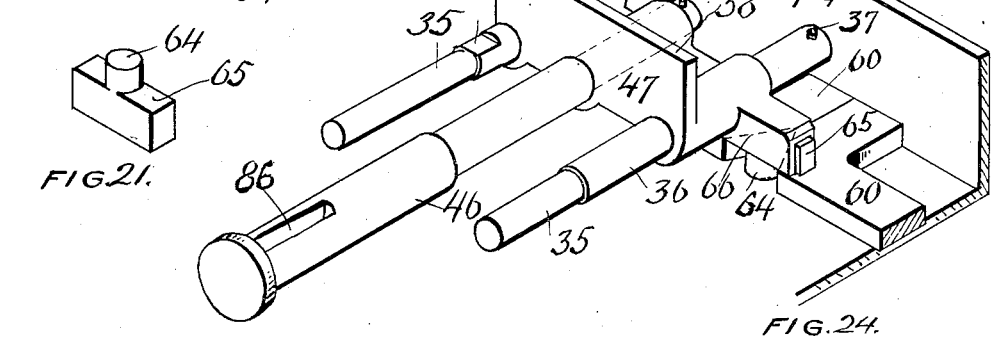
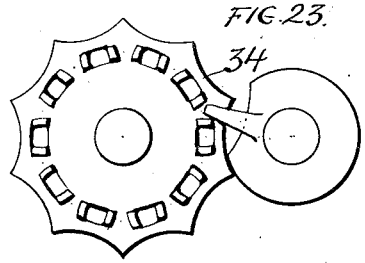
WITNESSES
INVENTOR.
James H. Dean.
By attys. Paul O. Hawley

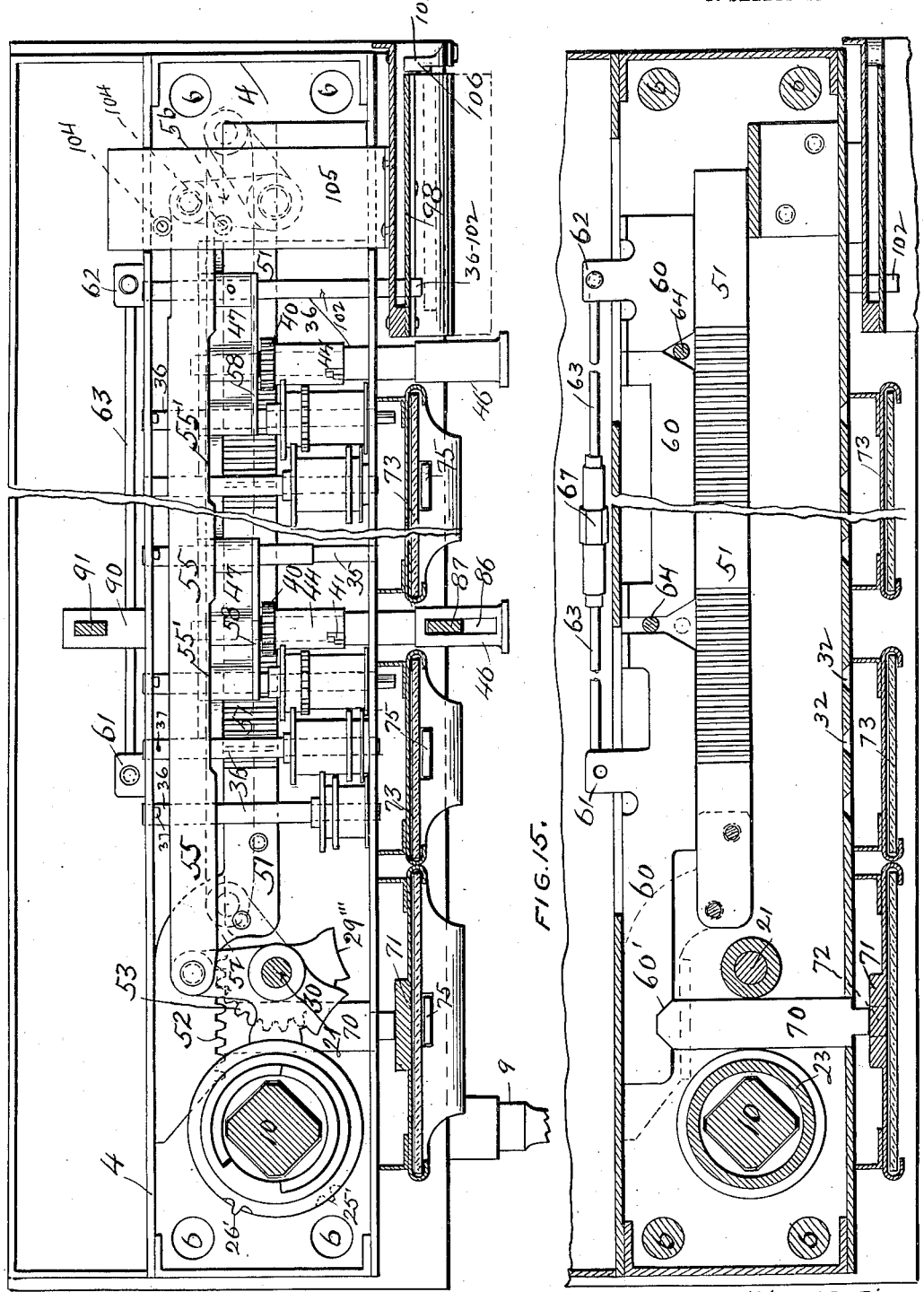

J. H. DEAN.
VOTING MACHINE.
APPLICATION FILED DEC. 30, 1899. RENEWED JUNE 8, 1904.

1,055,449.

Patented Mar. 11, 1913.
10 SHEETS—SHEET 9.

J. H. DEAN.
VOTING MACHINE.
APPLICATION FILED DEC. 30, 1899. RENEWED JUNE 8, 1904.
1,055,449.
Patented Mar. 11, 1913.
10 SHEETS—SHEET 10.
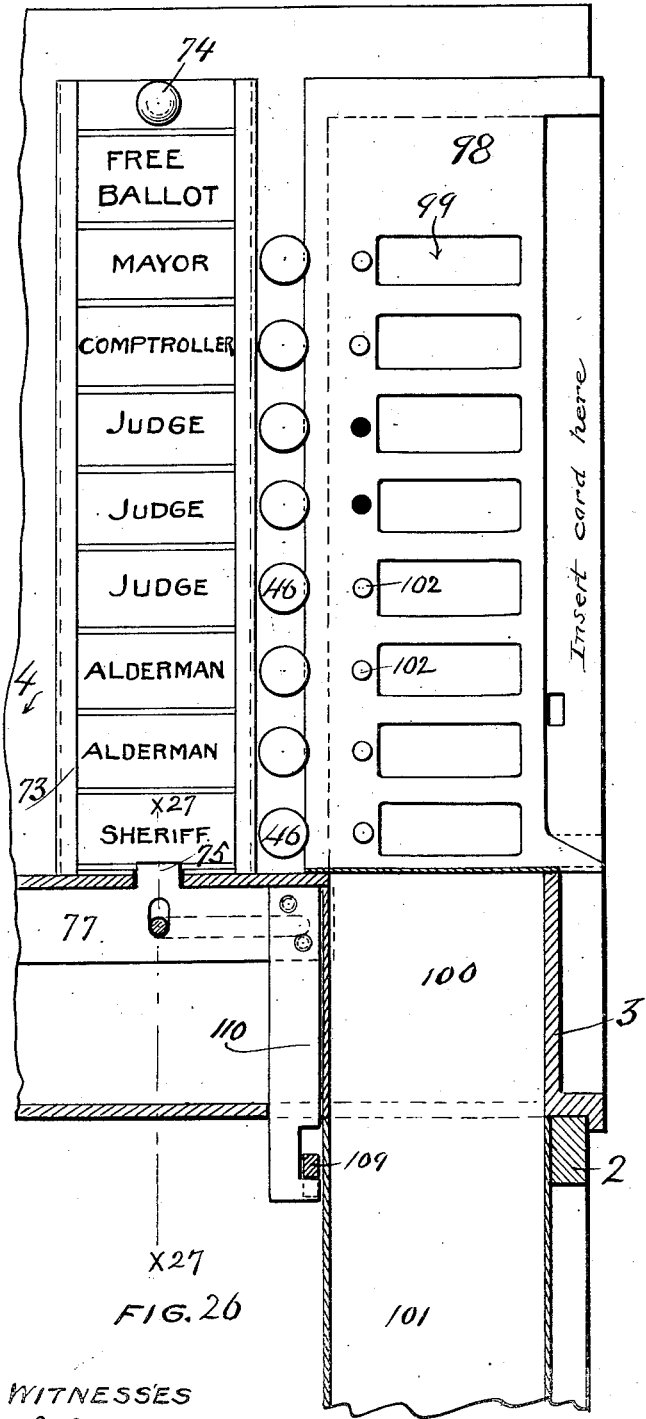
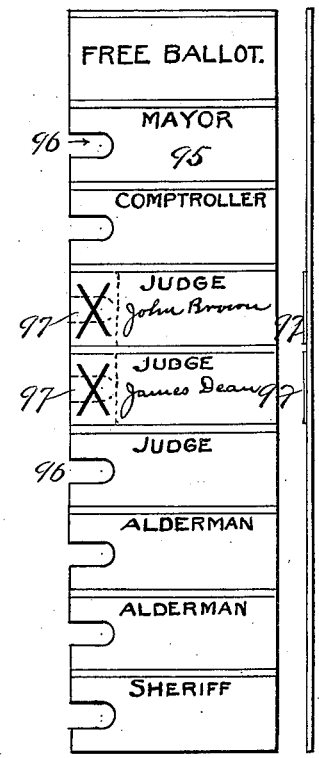
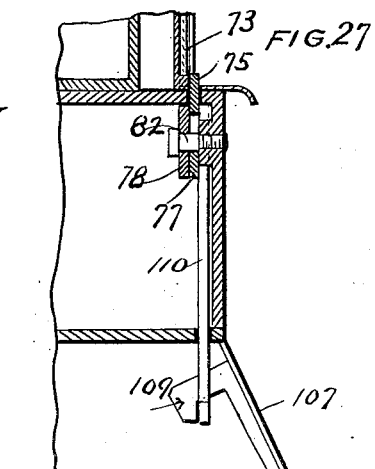
WITNESSES
INVENTOR.
James H. Dean
BY Paul O. Hawley
ATTORNEYS.

UNITED STATES PATENT OFFICE.

JAMES H. DEAN, OF ST. PAUL, MINNESOTA, ASSIGNOR, BY MESNE ASSIGNMENTS, TO EMPIRE VOTING MACHINE COMPANY, A CORPORATION OF NEW YORK.

VOTING-MACHINE.

1,055,449.    Specification of Letters Patent.    Patented Mar. 11, 1913.

Application filed December 30, 1899, Serial No. 742,031. Renewed June 8, 1904. Serial No. 211,612.

*To all whom it may concern:*

Be it known that I, JAMES H. DEAN, of the city of St. Paul, county of Ramsey, State of Minnesota, have invented certain new and useful Improvements in Voting-Machines, of which the following is a specification.

This invention relates to voting or ballot machines, and particularly to improvements of the voting machine shown and described in Letters Patent No. 636,730, granted to me November 7, 1899.

The objects of the invention are to improve the structure illustrated in the aforesaid patent, and to provide straight ticket and free-ballot mechanisms peculiarly suited to the sectional form of the voting machine.

The invention consists generally in a voting machine of the construction and combination of parts all as hereinafter described and particularly pointed out in the claims.

The invention will be more readily understood by reference to the accompanying drawings, forming part of this specification, and in which—

Figure 1:
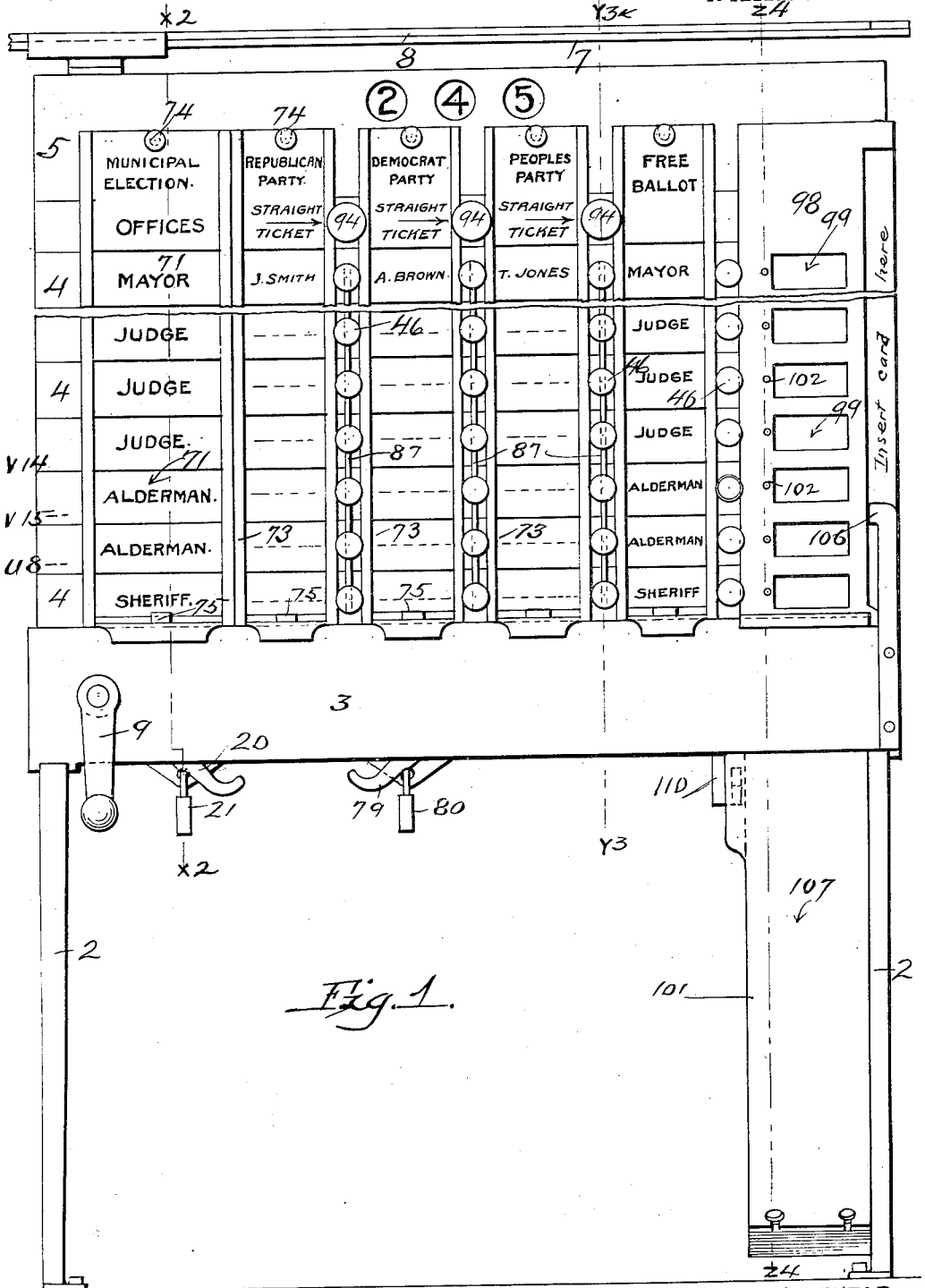
Figure 18:
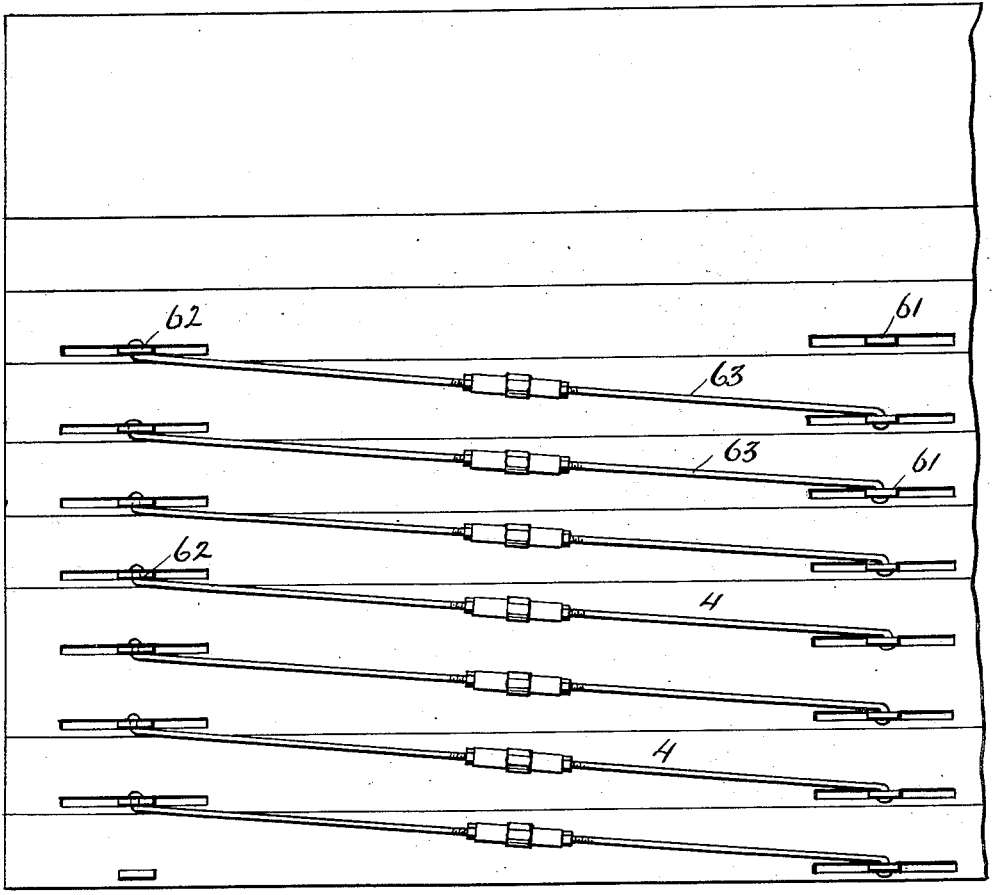

Figure 1 is a front view of a voting machine. Fig. 2 is a vertical section on the line $x^2$—$x^2$ of Fig. 1. Fig. 3 is an enlarged vertical section on the line $y^3$—$y^3$ of Fig. 1. Fig. 4 is a vertical section on the line $z^4$—$z^4$ of Fig. 1. Fig. 5 is an end view of the machine. Fig. 6 is a vertical section through the base of the machine on the line $x^6$—$x^6$ of Fig. 2. Fig. 7 is a horizontal section on the line $x^7$—$x^7$ of Fig. 6. Fig. 8 is a horizontal section on the line $u^8$—$u^8$ of Fig. 9. Fig. 9 is a vertical section on the line $x^9$—$x^9$ of Fig. 8. Fig. 10 is a detail of the unit wheel-clutch of the counter. Fig. 11 is a perspective detail of one of the actuators. Fig. 12 is a detail of the stop mechanism, on the line $x^{12}$—$x^{12}$ of Fig. 9. Fig. 13 shows the same mechanism on the line $x^{13}$—$x^{13}$ of Fig. 10. Fig. 14 is a top view of one of the sections of the machine on the line $v^{14}$—$v^{14}$ of Fig. 1. Fig. 15 is a horizontal section on the line $v^{15}$—$v^{15}$ of Figs. 1 and 3. Fig. 16 is a front view of the office plate. Fig. 17 shows the card or plate with the names of the officers thereon. Fig. 18 shows the transmitting rods of the limiting mechanisms. Fig. 19 is a perspective view showing the limiting blocks and the separator. Fig. 20 is a perspective view showing the bottom of the separator. Fig. 21 shows the separator pin. Figs. 22 and 23 are two of the views of the counter wheels. Figs. 24 and 25 are two similar views of a modified construction of the counter wheels. Fig. 26 is a front view of the free ballot portion of the machine. Fig. 27 is a sectional view on the line $x^{27}$—$x^{27}$ of Fig. 26. Figs. 28 and 29 are face and edge views of the free or independent ballot.

This voting machine, like that shown and described in the aforesaid Letters Patent, is preferably made up of machine units, each unit having enough counters for all of the candidates for a given office. I may say, however, in the beginning, that there are numerous features of the voting machine that do not depend for novelty or utility on the sectional or unit feature, although such features are particularly adapted for voting machines of the unit or sectional type.

The machine comprises a base section and a top section, with as many machine units interposed as are required from the number of offices to be filled at an election. The base and the top may be used with any required number of units or voting machine sections, requiring no alteration or modification when the number of units is increased or decreased. The face plates of the machine and like parts that extend parallel to or longitudinal with respect to the political tickets, alone requiring change when the number of units is increased.

The construction of the machine will be best understood from a detail description of its principal parts set forth in the following; after which the operation of the mechanisms will be explained.

*The frame of the machine.*—I prefer that the frame be of sheet-metal. Supported on the legs 2 it comprises the base frame 3, the unit frames 4—4 and the top frame 5, to which I add a sheet-metal back, to protect and conceal the parts thereof on the backs of the unit frames. The sections of the frame are held together in any suitable way, as by bolts 6 passing through all thereof. In addition the sections may be interlocked in any other suitable way. The base and the top are preferably closed on all sides. The machine unit frames or sections have open tops, each being closed by the bottom of the one above it. The unit frames are just deep enough to hold the counter wheels, the height or width thereof being reduced as much as possible by cutting out the bottoms beneath the counters. Thus the frame of the machine is wholly made up of the carrying-frames or sections for the three units, the base, the voting machine unit and the top. They are made rigid by the tie-bolts and support the booth of the machine. This booth is preferably a curtain hanging from a rod 7 on the top section and which is distended and collapsed by a swinging arm 8 that is pivoted on the top 5. It is operated by the crank 9 on the base 3. Its relation thereto and to the voting mechanisms will be defined in connection with the motor mechanisms of the machine.

*The motor devices.*—By reference to Figs. 2, 6, 7, 8 and 9, 12 and 13 it will be seen that a shaft 10 extends upward from the base 3 to the top of the machine, passing through all of the unit frames, which latter will hereinafter be termed office unit frame to distinguish the same from the top and bottom units. The lower end of this shaft rests upon a step 11 in the frame 3, and within said frame the shaft is provided with two sleeves 12 and 13, one upon the other. The sleeve 12 is provided with the machine locking surface 14, the bevel gear 15 and the stop 16. The stop 16 and the sleeve 13 and the stop 17 upon the rocker 18 have to do with the degree of rotation of the shaft 10. The shaft of the crank 9 is provided with the miter-gear 19 that meshes with the gear 15 to turn the sleeve 12 and therewith the shaft 10. The stop 17 is moved by the arm 20 that extends through a slot in the bottom of the frame 3 and is secured by a padlock 21, see Fig. 6. When the stop 17 is in the position shown in Figs. 6, 12 and 13, the sleeve 13 will permit one complete revolution of the stop 16 and the shaft 10 in both directions. The sleeve 13 moves before or with the stop 16 until blocked by the stop 17. When the padlock 21 is removed and the arm 20 is swung down to the dotted position indicated in Fig. 6, the stop 17 will be as shown in Fig. 9, freeing the sleeve 13 so that the shaft may be turned more than one revolution, as required to release the counter-actuators so that the counters may be returned to zero. The stop 17 and the arm 20, with the padlock, constitute the city clerk's lock, being operated only when it is desired to put the machine in order for an election, after which the arm 20 is secured by the padlock and so remains throughout the voting period and while the returns are being taken from the machine. A device that is the reverse of the sleeves 12 and 13 is arranged between the upper end of the shaft 10 and the swinging booth arm, so that said arm does not begin to move until the counting operations and restoring operations of the voting mechanisms have been accomplished during the early part of the revolution of the shaft 10 in directions corresponding to the exit and the entrance of voters to the machine.

*The motor devices of office units.*—Each office unit is provided with a motor device in two parts 23 and 24, the former having a square hole to fit the shaft 10, which passes through all thereof. The part 23 bears the intermittent gear 25, having the single tooth 25', and the part 24 has the gear 26 having the single tooth 26'. The part 24 is a sleeve upon the part 23 and is provided with the stop section 27, playing in the peripheral notch 28 in the upper edge of the part 23, whereby the latter may move a half revolution before the intermittent gear 26 comes into action. This gives time for the operation of the counter actuators before the returning and locking means operate. The motor device of the office-unit is completed by the two intermittent gears 29 and 30 for operation by the gears 25 and 26 respectively. These are arranged upon the vertical stud 21 in the unit frame. Before describing the parts that are operated by the gears 29 and 30, I will explain the construction of the counters and counter actuators.

*The counters.*—Six or seven counters may be provided in each office-unit, more if desired. I prefer three dial counters. Each dial 31 has ten figures which show through holes 32 in the front of the frame. Each dial is attached to a "stack" 33 of gears, all together comprising a train of gears whereby one complete revolution of the unit stack is communicated to the tens stack to advance the same one step and in like manner advance the hundreds stack when the unit stack has been revolved ten times. Intermittent gears are employed, see Figs. 22 to 25, and a novel feature is the locking wheel 34 on each stack, independent of the intermittent gear and positively preventing the jamming of the intermittent teeth. The regular teeth upon the tens and hundreds stacks may be struck up from the locking gear or wheel 34, as shown in Fig. 23. The cylindrical surface which bears the intermittent tooth upon the adjacent stack, units, tens, is mutilated at the tooth to free the locking wheel 34 when the tooth is in engagement with the regular gear. The stacks are placed upon the reduced ends 35 of the cross-studs 36. Instead of fastening the studs as in former machines, they are left free to turn, being fastened by pins 37, driven through the same inside of the back wall of the unit frame after the studs are inserted. The stud 36 upon which the unit stack is placed is provided with a square part 38 upon which the sleeve of the unit stack fits. The end of this stud sticks beyond the front or face of the frame and is made square to receive a crank or tool, and when the same is turned thereby the counter stacks or wheels, previously released from the actuator, are turned to reset the dials at zero.

*The actuators.*—The actuator for each counter is a cylinder, having at one end a spur pinion 40 by which it is turned, and at the other end an intermittent tooth 41 to engage the regular gear upon the unit stack and turn the counter one number. This occurs however only after the cylinder has been pushed in far enough to bring the tooth 41 into the plane of the gear on the unit stack. The cylinder is provided with a notch or mutilation 42, permitting the same to turn with respect to the locking wheel 34 of the counter. The rear shoulder 43 prevents the withdrawal of the actuator after it has started to turn.

44 is the locking surface of the actuator, which is in engagement with the locking wheel 34 of the unit stack throughout the voting period except when the actuator is pushed in, to position the tooth 41. The opposite end and side of the cylinder has a notch or mutilation 45 that is turned around opposite the locking wheels of the counter when the city clerk's lock 20 is thrown into the dotted line position, Fig. 6, and the shaft 10 is turned an excessive distance, more than one revolution, as before mentioned. When the actuator is in this position the counters may be returned to zero.

*The keys.*—The keys 46 preferably carry the actuators, which rotate freely thereon. The keys may be made so that they can turn freely by slightly modifying the straight-ticket device hereinafter explained. Each key slides through a hole provided for it in the front of the unit frame. The rear end of the key is supported by the slide 47, wherein the key shank is secured by a pin 48. This slide may be moved freely back and forth upon the rear ends of two of the studs 36. A shoulder 49 on the key prevents the same from being pushed in too far. A part on the slide 47 limits the forward movement of the key.

*The actuator-operating-means.*—All of the counter actuators in the one-unit frame are operated by one device, and are rotated upon both the entrance and the exit of the voter to the machine, whether the keys have been pushed in or not. This operating device is the rack 51 with which all of the pinions 40 mesh, and the rack is wide enough to permit the actuators to be pushed in without moving the pinion out of mesh with the rack. It will be understood that the key, the actuator and the slide 47 all move back and forth together across the rack.

The actuators alone rotate. The rack 51 lies on the bottom of the unit frame 4 and slides thereon, longitudinally in the frame. A side rack 52 is attached to the end of the rack 51 and meshes with the gear teeth 53 upon the intermittent gear 29, which latter moves positively with the movements of the shaft 10, so that each time that the crank 9 is turned the rack 51 will be reciprocated to rotate the actuators and move the counter or counters for which the actuator or actuators have been set by means of the voting keys. Ordinarily the oscillation or movement of the intermittent gear 29 is from the locking face 29' to the locking face 29'' and return. It is only when the city clerk's lock is released and the shaft 10 is turned beyond one revolution that a further step of the gear 29 is made, bringing the locking surface 29''' into play as shown in Figs. 8 and 9. This produces the excessive movement of the slide 51, which presents the notches 45 in the actuators to the opposite counters, unlocking the counters to permit the reinstatement thereof to zero.

*The key-locking and returning device.*— The device for returning and locking the keys comprises the parallel movement bar 55, carried at one end by a link 56 and at the other end by an arm 57 on the intermittent gear 30. The gear 30 has but two locking surfaces, and is oscillated from one to the other through the delayed or tardy operation of the motor part 24. By this means the bar 55 is thrown forward and back. Upon the forward movement the bar engages the lugs or flanges 58 upon the slides 47 and throws the keys forward. The rearward movement of the bar 55 releases the keys and slides. In its forward position the bar serves as the lock for the key. The lock is made safer by providing the notches 55' in the bar 55, the ends thereof engaging with the shoulders or ends of the flanges 58 on the slides 47, so that very slight force need be applied to the gear 30 to hold the bar 55 against pressure upon the keys.

*The limiting mechanism.*—A voting machine is not complete without means that operate to prevent the casting of more than a given number of votes by one voter. This means is called the limiting mechanism. In this machine the limiting mechanism comprises a series of wedge-blocks in each unit-frame, separators movable by the keys, means connecting the several series of blocks, and, grouping means.

60—60 represent the wedge-blocks. Each machine unit has one more wedge-block than it has keys. These blocks slide on the bottom of the unit-frame between the rear wall thereof and the rack 51. The first and last blocks 60 are provided with lugs 61, 62, respectively, extending through slots in the back of the unit-frame.

63—63 are transmitting bars, rods or ties that successively connect the lug 62 on the last block in one unit to the lug upon the first block in the unit below it. Thus from the top to the bottom of the machine the sets or series of wedge-blocks are tied or connected together so that if no means are interposed to limit the movement of the blocks in any of the units or sections, movement might be communicated from the limiting blocks of one section to those of others. Such would be the case when the whole machine constituted a multi-candidate group. The ties 63 are longer in proportion than the series or set of blocks in one unit when the same are pushed together. The difference in length is one step; in other words the diameter of one separator, so that one can always be pushed in without affecting the limiting devices in adjoining units. The separators are of the compensating type. Each comprises a pin 64 made on a block 65, slidable in the guides 66 depending from and formed in the underside of the slide 47. It is this guide which engaging the edge of the rack 51 limits the forward or return movement of the key. The ends of the wedge-blocks are beveled. When the blocks are pushed together a V-notch is formed. The separator pin is in this notch. If the blocks are moved longitudinally in the frame the pin will be moved along with the same, traveling in the guide of the slide 47, transversely to the key. Thus regardless of the position of the blocks the separator pin always has the same relation thereto and when a key is pushed in the separator will be forced between the blocks to spread the same and elongate the series of blocks. Obviously it is only necessary to provide stops for the first and last blocks to limit the number of keys that may be operated. If the movement of the blocks is limited to one step then but one key can be pushed in; if two are permitted then two keys may be manipulated. Gravity and friction alone hold the key when it is pushed in and it is evident that a key may be pulled out by a voter if perchance he wishes to change his vote. The transmitting rods or ties 63 are made adjustable by turn-buckles 67 or other suitable means so that the one-step difference between the lengths of the rod 63 and the sets of blocks may be accurately determined. Wear is also taken up by the turn-buckles. If a machine unit is to be used for a single office, that is to represent an office to which but one candidate may be elected, the end blocks are locked; one step is provided between the blocks to allow insertion of a single separator, and no movement is communicated to the adjoining limiting mechanism. But it often occurs that there are offices to which several persons are to be elected and such conditions necessitate multi-candidate groups in voting machines. That is several office-rows or units must be coupled together to permit a voter to cast all of his ballots for the candidate named in a single row or to vote the straight ticket or otherwise cut up his ballot. I find it convenient to construct every unit of the machine so that it may be used in a multi-candidate group and hence the employment of the freely sliding sets of blocks and the tie-rods. With the first block of the lowest office unit locked and the last block of the top unit also locked, it will be possible to push in as many keys as there are office units or office rows, bunching the keys or voting a straight ticket, as the voter desires. The limit of this sort of arrangement is determined by the length of the guides on the slides 47 and the lengths of the slots in the backs of the frames, through which the lugs 61 and 62 project. These dimensions are made to suit maximum requirements. It will rarely be necessary to use a whole machine of from twenty to thirty sections, units or office rows, as one multi-candidate group. Usually most of the units will represent single offices, with a few units grouped together for multi-office or multi-candidate voting. It is necessary therefore to provide each machine unit with means for locking its limiting mechanism against more than one step, or freeing the same to permit communication of movement between two or more adjoining units or rows of mechanisms. The means employed for this purpose is called the grouping mechanism. To separate the limiting mechanisms of adjoining units, it is only necessary to lock the first block of the lower one thereof. When the first blocks 60 of two adjoining units are locked no movement will be communicated from the limiting mechanism of the upper one to any other mechanism. The first block 60 in each unit is provided with a notch 60', the sides of which are inclines or cams to engage the similarly shaped end of the cam-piece 70 extending through a hole in the front of the unit frame and held between cylindrical bosses on the motor gear 23 and the rack gear 53. This pin cannot move laterally but may move longitudinally, that is transversely of the unit frame. When the cam piece 70 is held in it locks the block 60 against movement in any direction. This is the arrangement in each unit.

To lock the cam pieces there is a name plate 71 applied to the front of the machine and bearing the names of the offices to be filled. In the back of this plate are holes or recesses 72 to admit the ends of certain of the cam pieces 70. One of these plates is provided for and appropriated to each election or kind of election in which the machine is to be used; municipal, State, national or all. The names have a fixed position on each of these plates and the holes 72 are differently located and perhaps of different number in the different plates. When the plate is fixed upon the face of the machine its solid portions engage the cam pieces 70 in single-office units and at the boundaries of the multi-candidate groups. The holes in the plate permit the corresponding cam pieces 70 to be pushed out on the first operation of their wedge-block, removing the limitations upon the wedge-blocks that are intermediately situated in a multi-candidate group, and thus the limiting mechanism of certain adjoining units are allowed to coöperate. The relations of the holes in the plate 71 and the names thereon are shown in Figs. 16 and 17. This name-plate need not be formed in two parts, as shown. The holes 72 may be mere recesses in the back of the plate. This plate and the card-frames 73—73 are secured upon the front of the machine by buttons 74 on the top section and lock-bolts 75 in the base. The bolt 75 for the plate 71 is attached to the part 18 and is operable only by the city clerk. The other card-frames must be removable by the judges of election, in order that the returns may be taken from the machine. I therefore provide a judge's lock comprising the bar or plate 77 carrying the bolts 75 for the card frames, a reciprocating plate 78, an operating lever 79 and a padlock 80. The bolts 75 stick up through the projecting part of the base and are moved up and down by means of the inclined slots 81 in the bar 77 and the pins 82 on the bar 78, which latter is reciprocated by the lever 79, when the padlock is removed. 83 is a machine-locking bolt. The end of the bar 78 butts against this, and the end of the bolt 83 in turn butts against the cylindrical portion of the sleeve 12 except when the locking surface 14 before referred to is in the position shown in Figs. 6 and 7. When in this position the bars 55 will be in their forward positions and all of the keys will be locked. They cannot be unlocked except by turning the shaft 10 through the medium of the sleeve 12, therefore when the lever 79 is thrown to unlock the card frame the bolt 83 is shot forward and permanently locks the machine against further manipulation, for said bolt or lock 83 is not attached to the plate 78 and cannot be withdrawn by the judge after it is once thrown. The lock 83 is provided with a depending lug 84, and the lever 20 is provided with an upward extension 85 to engage the same, whereby the city clerk or deputy may unlock the machine preparatory to releasing the counters and turning the same back to zero.

*The straight ticket mechanism.*—The political tickets extend vertically. The same may be horizontal. The keys 46 are provided with notches or slots 86, and each row of keys has a straight ticket bar 87. The slots 86 are long enough to allow the setting of a key independently of the bar. 89 is a reciprocating bar, in the end of which the bar 87 is hung. 90 is a like reciprocating bar. These extend through the unit frames. There are two of them for each straight ticket bar. For each political ticket there is a parallel movement bar 91 in the back of the machine. This passes through holes in the ends of the bars 89 and 90. The bar 91 is held by parallel links 92—93 at its upper and lower ends. The link 92 is extended beyond the pivot of the bar 91 and to its lower end is attached the end of the straight ticket key 94. When this key is pushed in the bar 91 will be thrown back, sliding through and drawing back the bars 89, 90, and therewith the straight ticket bar 87 and all of the keys in that political ticket. If desired the counters may be associated with the straight ticket keys and I have shown actuators and a rack in the top or straight ticket unit to represent the complete counter mechanisms and the returning means. To avoid confusion it may be here mentioned that it is unnecessary to provide a returning bar in the straight ticket unit of the machine as the bars of the other units in returning their keys will return the straight ticket bar 87 and therewith the connected parts including the straight ticket key. For a similar reason it is unnecessary to provide a limiting mechanism in the straight ticket unit.

Every voting machine should have means whereby a voter may indicate his choice of a candidate or person not regularly nominated and whose name does not appear upon the face of the machine. The means or mechanism provided to this end is variously called the independent ballot, the irregular voting device or the free ballot mechanism. It is essential that means should be provided to prevent the voter invalidating his ballot by depositing his free ballot in the wrong place, and also prevent fraud which with some machines may be arrived at by writing the name of a single person more than once upon the free ballot devices. These conditions and many others are recognized and met in that portion of my invention pertaining to the free-ballot mechanism. My invention contemplates the use of a single free or irregular ballot card whereon a space is allotted for each office to be filled at an election and which card as a whole is deposited in the machine and remains secret until the returns are taken. This card is illustrated in Figs. 28 and 29. It is divided into spaces bearing the names of the offices with sufficient blank space beneath each to receive the name which the voter writes thereon. For each space 95 on the free ballot there is a notch 96 and in addition to writing the name of his candidate the voter is required to paste a sticker 97 over the notch opposite his ballot. The writing may be done on the sticker 97. On the end of the machine is the frame 98, between the back and the front of which is room for one free ballot card. The edge of the frame is open to receive the card. The front of the frame is provided with holes 99 through which the face of the card may be seen after it is inserted. The bottom of the frame is open. It is normally closed by the projecting top of the base 3, but the frame is made to move out over a slot 100 therein, whereupon the card that has been previously inserted will drop down through said slot 100 into the receiving box 101. To prevent the casting of both free and regular ballots by one voter it is necessary to compel the locking out of the regular mechanisms when a free ballot is used, hence the free ballot mechanism includes a series of keys, counters and separators like those previously described and which effect the limiting mechanism in like manner. The last cross-stud in each unit is elongated or a separate pin 36—102 may be provided. This has no pin 37 but is pinned to the shifter or slides 47 of the counting device, so that when a key is pushed in the pin 102 will be withdrawn from the frame 98 through holes in which it normally projects. The pins 102 register with the notches 96 in the free-ballot card and to prevent the mutilation of the sticker 97 thereon, which would invalidate his vote, a voter must push in a corresponding key in the last column on the machine, thereby operating the limiting mechanism and cutting out one regular vote. After a voter has deposited his free ballot he may retract the same by pulling out the free ballot key and by means of the pin 102 puncture and invalidate the sticker upon the free ballot. All of the pins 102 are of such length that they do not overhang the slot 100, hence when the frame 98 is pushed out the pins will be virtually withdrawn from the notches in the card and the card will drop into the box 101. This movement of the frame 98 is accomplished by straddle pins 104 provided on two plates 105, extending through the frame of the machine from the frame 98 and engaging two of the bars 55, see Fig. 14.

106 is a fixed closure provided on the frame and which prevents the insertion of a card into the free ballot frame when the latter is in its outer position.

The box 101 is provided with a cover or front 107, having its lower end secured by buttons 108 and its upper end secured by a hook 109. This hook is engaged by the hook piece 110 extending through the bottom of the base 3 and forming a part of or attached to the bar 77, so that when the card frames are unlocked the front of the free-ballot box is also unlocked and may be removed for access to the free ballot.

The operation of the counters, the return of the keys and the outward movement of the frame 98 to deposit the free ballot all occur when the voter turns the crank 9 to open the booth on retiring from the machine.

A total counter is arranged in the top of the machine and operates with the booth device to count the number of voters.

It is obvious that various modifications of the structure herein shown and described may be made without departing from the spirit of my invention and without altering the operation thereof.

The operation of the machine is as follows: The face of the machine is normally exposed, that is the booth curtain or structure is swung to one side or collapsed at the side of the machine. At this time all of the bars 55 will be in their forward positions; the keys will be in their outer positions; the actuators will be turned away from the counters, locking the same, and the free-ballot frame will be in its outer position. A voter upon entering to the machine turns the crank 9, thereby closing the booth, rotating the actuators so that the teeth stand opposite the counters, and finally throwing back the locking and returning bars 55 and the free-ballot frame. The voter then concealed, pushes in the keys for candidates of his choice positioning the actuators for operation upon the counters and forcing the separators between the blocks of the limiting mechanism until the limit of each section of the limiting mechanism is reached. He will then find it impossible to operate further keys unless he first retracts some of the keys previously pushed in. If the voter desires he may use one of the straight ticket keys, thereby voting the entire column of individual keys beneath it. After so voting the column he may retract the straight ticket and any of the individual keys that he wishes and may then vote corresponding individual keys in the same office row or multi-candidate groups. He may in the same manner use the keys of the free ballot and afterward insert the free-ballot card with the vote stickers thereon. Having finally completed his ballot the voter again grasps the crank 9 and turning the same in the opposite direction successively operates the rack bars 51 and thereby the positioned actuators to register his votes upon mechanical registers, and then return the bars 55 and move out all of the keys and the free-ballot frame to deposit the free ballot. A further continued movement of the crank the remainder of the revolution opens the booth and the voter retires. When the polls are closed the judge removes the padlock 80 and throwing down the bar 77 locks the machine against further manipulation, after which the card frames may be removed to expose the count. The front of the free-ballot box is also removed and the free ballots are counted. After taking the returns the judge replaces the ballot-box cover and the card frames, and after restoring the lever 79 secures the same by the padlock. When it is desired to prepare the machine for the next election the city clerk or other official unlocks the machine by removing the padlocks 21 and 80 and operating the levers 20 and 79, after which the crank may be turned to free the actuators from the counters so that the counters may be separately set back to zero. The grouping plate or name plate 71 is removed and another one made according to the requirements of the next election is put in its place, thereby adapting the limiting mechanism of the machine to the next election. The card frames are then replaced and locked and the machine is ready for use.

Having thus described my invention, I claim as new and desire to secure by Letters Patent:

1. The combination with a row of individual keys and a separate straight ticket key, of a shifter bar controlled by said straight ticket key, a second bar engaging all of said individual keys, and movable connections extending between said bars for effecting the simultaneous movement of said individual keys by the operation of said straight ticket key, substantially as described.

2. In a voting machine, the combination with the voting mechanisms and the row of individual keys belonging thereto, of the frame or casing, a straight ticket bar for engaging and moving all of said keys and with relation to which said keys are independently movable, carrying rods for straight ticket bar, a second parallel movement bar engaging said carrying rods within the frame, and a straight ticket key for operating said parallel movement bar, substantially as described.

3. In a voting machine, the combination with an office row of voting keys, counting and limiting mechanisms, of motor means, and the returning bar operable by said motor means to return the keys, said bar being notched at the points of engagement with the key devices, for the purposes specified.

4. In voting machines, the combination with the series of voters' keys, the rotary actuators controlled thereby and the corresponding series of counters, all arranged in separate party sets, appropriate to the several individual offices, of a returning bar common to the voters' keys of any given set to release or lock said keys, a reciprocating shifter such as a rack plate, to simultaneously rotate the actuators of the same set, and the prime motor suitably timed to work the actuators first as the voter retreats and, in reverse, to work such actuators first as the next voter advances into the machine, substantially as described.

5. The voting machine frame, in combination with the counters, keys, actuators and separators arranged in said frame, the actuator-operating rack-bar and the limiting blocks engaged by said separators and held and guided between the wall of the frame and said rack bar, substantially as described.

6. The machine frame, in combination with the keys, the counters and the rotary or operating actuators, the actuator-operating rack-bar, operating means therefor, said keys having shoulders limiting their inward movement and said rack-bar limiting the outward movement of the keys.

7. The combination with the series of counters, of the rotary actuators therefor, positively actuated means for moving all of said actuators, means limiting the movement of the actuators to a certain degree normally, and means whereby an excessive movement may be imparted to the actuators to free the same from their counters so that the counters may be returned to zero.

8. In a voting machine, the combination with the frame, of the voting mechinsms for regular candidates, of the free-ballot mechanism comprising a movable frame, key-operated pins piercing said frame and preventing the insertion of a prepared ballot, unless corresponding keys are manipulated, substantially as described.

9. The combination in a voting machine, of the frame provided with the ballot box, with the voting mechanism for regular candidates free-ballot frame movable to position over said box and adapted to receive a notched card, and key-operated pins in the free-ballot frame, substantially as described.

10. In voting machines, the combination with the counters and the counter actuators, of the corresponding regular keys grouped with the counters and actuators in separate office sets, said keys being movable to and from voted position to correct or change a vote, a number of extra keys for irregular ballots, one to each office set, movable to and from voted position to check over the irregular ballot *in situ* on the machine, and a suitable limit mechanism common to all keys—both regular and irregular—of the particular set, said limit mechanism interacting responsively to the shift of any key, to block or unblock the other keys of the same set.

11. In voting machines, the combination with a set of counters for the candidates of a party, and a corresponding set of oscillating counter actuators, of a set of push keys for shifting said actuators into and out of operative relation with said counters, mechanism for operating said actuators to advance all of the counters corresponding to the keys left in voted position, a common shifter having a straight ticket or party key for moving all of said individual keys to voted position, locking and restoring means for said keys, said individual keys being shiftable independently of said straight ticket key to and from voted position, substantially as described.

12. In voting machines, the combination with a set of counters for the candidates of a single party, a set of actuators for said counters, said counters and said actuators being relatively movable in one direction into and out of operative relation and relatively movable in another direction to effect the operation of said actuators upon said counters, of operating mechanism for effecting one of the relative movements of said actuators and said counters, a set of individual keys for effecting the other relative movement of said actuators and said counters and a common shifter having a straight ticket or party key for operating all of said individual keys.

13. In voting machines, the combination with a set of keys for the candidates of a single party, the counters for said candidates, and the counter actuators, said keys being movable to and from voted position to throw said actuators into and out of operative relation with said counters, of mechanism for operating said actuators to advance all of the counters corresponding to the keys left in voted position, a common shifter having a straight ticket or party key for moving all of said individual keys to voted position, said shifter having a one-way connection with each of said keys, whereby said keys may be moved to voted position independently of said shifter.

14. In voting machines, the combination with a set of counters for the candidates of a single party, a corresponding set of counter actuators, said counters and said actuators being relatively shiftable in one direction into and out of operative relation and relatively shiftable in another direction to effect the operation of said actuators upon said counters, of operating mechanism for effecting one of the relative movements of all of said counters and actuators, a straight ticket device for effecting the other relative movement of all of said counters and actuators and a set of individual keys for separately effecting the same relative movement of said counters and actuators as is effected by said straight ticket device.

15. In voting machines, the combination with a set of counters for the candidates of a single party, of a corresponding set of counter actuators, a set of individual keys for separately shifting said actuators into and out of operation with said counters, a straight ticket device for shifting all of said actuators into operative relation with said counters and mechanism for operating said actuators to advance the counters corresponding to the actuators left in operative position.

16. In voting machines, the combination with a series of voters' keys and a series of counters controlled thereby, of means for restoring and locking said keys, and reciprocating operating mechanism having an entrance movement in one direction and an exit movement in the opposite direction, said operating mechanism being arranged to release said key locking and restoring means at the end of its entrance movement and to actuate the same to restore and lock said keys in normal position at the end of its exit movement.

17. In voting machines, the combination with a set of counters and a set of counter controlling keys, means for operating said counters, means for locking and restoring said keys, and controlling mechanism shiftable in opposite directions and arranged to successively move said counter operating means and release said key restoring and locking means when moved in one direction and to successively move said counter operating means and actuate said key restoring and locking means when moved in the opposite direction.

18. In voting machines, the combination with a series of counters and a series of counter controlling keys, of actuating mechanism controlled by said keys for advancing said counters, locking and restoring mechanism for said keys, a common device for controlling the operation of said counter actuating mechanism and said key locking and restoring mechanism, said device having an entrance movement in one direction and an exit movement in the opposite direction and arranged to successively move said counter actuating mechanism and to release said key locking and restoring mechanism on its entrance movement and to successively operate said counter actuating mechanism and said key locking and restoring mechanism upon its exit movement.

19. In voting machines, the combination with a series of counters, a set of counter actuators and a set of voters' keys controlling said actuators, said keys being movable to and from voted position to correct or change a vote, of means for moving said actuators to advance the counters corresponding to the keys left in voted position, restoring and locking means for said keys and actuators, and common controlling mechanism for said actuator operating means and said locking and restoring means, said controlling mechanism having an entrance movement in one direction and an exit movement in the opposite direction and being arranged to successively move said actuators and release said key locking and restoring means on its entrance movement and to successively move said actuators and operate said key locking and restoring means on its exit movement.

20. In voting machines, the combination with a series of counters, a corresponding series of counter actuators, and a series of controlling keys movable to and from voted position to correct or change a vote, operating mechanism for relatively shifting said counters and actuators to advance the counters corresponding to the keys left in voted position, locking and restoring mechanism for said keys, and a common device for controlling said operating mechanism and said key locking and restoring mechanism, said device being shiftable in opposite directions and arranged to successively move said operating mechanism and release said locking and restoring mechanism when moved in one direction and to successively actuate said operating mechanism and said locking and restoring mechanism when moved in the opposite direction.

21. In voting machines, the combination with a series of counters and a series of counter actuators, said counters and said actuators being relatively movable in one direction into and out of operative relation and relatively movable in another direction to effect the operation of said actuators upon said counters, of operating mechanism for effecting one of the relative movements of all of said counters and actuators, a set of individual keys for separately effecting the other relative movement of said counters and actuators, locking and restoring mechanism for said keys, a common member controlling said operating mechanism and said locking and restoring mechanism, said member having an entrance movement in one direction and an exit movement in the opposite direction and arranged to successively shift said operating mechanism and release said locking and restoring mechanism on its entrance movement and to successively actuate said operating mechanism and said locking and restoring mechanism on its exit movement.

22. In voting machines, the combination with a set of counters and a set of counter controlling keys, said keys being movable to and from voted position to correct or change a vote, an operating member movable in opposite directions for advancing the counters corresponding to the keys left in voted position, a member movable in opposite direction for locking and restoring said keys, and a common controlling mechanism for said operating and said locking and restoring members, said mechanism having an entrance and an exit movement and arranged to successively shift said operating member and release said locking and restoring member on its entrance movement and successively actuate said operating member and said locking and restoring member on its exit movement.

23. In voting machines, the combination with a series of counters and a series of counter controlling keys movable to and from voted position to correct or change a vote, of an operating member shiftable in opposite directions for advancing the counters corresponding to the keys left in voted position, a locking and restoring member for said keys shiftable in opposite directions, and common controlling mechanism for said operating and said locking and restoring members, said mechanism being movable in opposite directions and arranged to successively move said operating member and release said locking and restoring member when moved in one direction and to successively actuate said operating member and said locking and restoring member when moved in the opposite direction.

24. In voting machines, the combination with a Geneva stop counter, and a Geneva stop actuator constantly interlocked therewith, said counter and said actuator being relatively movable in one direction into and out of operative relation and relatively movable in another direction to effect the operation of said actuator upon said counter, of means independent of the teeth of said actuator and said counter for holding said parts in operative relation during the operation of said actuator upon said counter, substantially as described.

25. The combination with the individual voting mechanisms and the series of limiting devices therefor, located in the back of the machine, of the replaceable name-plate located at the machine-front and having arbitrary abutments thereon, members movable by said limiting mechanisms and extending across the machine and engaging with the abutments of said name-plate to regulate the operation of said limiting devices.

26. The combination with the individual voting mechanisms and the series of limiting devices therefor, located at the back of the machine, of the removable plate on the machine-front having arbitrary abutments thereon and suitable connections extending across said machine and engaging with said plate and the limiting devices to determine the play of the latter, substantially as described.

27. In a voting machine, the combination with the frame of the office rows of voting mechanisms, each including a row of limiting devices, the transmitting devices interposed between said rows of limiting devices, cam pieces, one for each row of limiting devices, and a grouping bar or plate engageable with said cam pieces, substantially as described.

28. In a voting machine, the combination with the frame of the office rows of voting mechanisms, each including a row of limiting devices, the transmitting devices interposed between said rows of limiting devices, cam pieces, one for each row of limiting devices, and a grouping bar or plate engageable with said cam pieces and bearing the names of the offices to be filled at the election for which the certain grouping plate is designed, substantially as described.

In testimony whereof I have hereunto set my hand this 27th day of December, 1899, at Minneapolis, Minn.

JAMES H. DEAN.

In presence of—
C. G. HAWLEY,
M. E. GOOLEY.